United States Patent

[11] 3,622,698

[72] Inventors William E. Richeson, Jr.;
Robert H. Dreisbach, both of Fort Wayne, Ind.

[21] Appl. No. 803,612
[22] Filed Mar. 3, 1969
[45] Patented Nov. 23, 1971
[73] Assignee The Magnavox Company
Fort Wayne, Ind.

[54] FACSIMILE SYSTEM WITH SELECTIVE CONTRAST CONTROL
24 Claims, 34 Drawing Figs.

[52] U.S. Cl. .......... 178/6, 178/DIG. 16, 307/230, 307/290
[51] Int. Cl. .......... H03k 3/295, H04m 11/08, H04n 1/40
[50] Field of Search .......... 178/6, DIG. 16, DIG. 13; 179/2 C, 2 DP; 307/290, 230; 333/81

[56] References Cited

UNITED STATES PATENTS

| | | | |
|---|---|---|---|
| 2,026,379 | 12/1935 | Farnsworth | 178/DIG. 3 |
| 2,372,344 | 3/1945 | Sprague | 178/DIG. 16 |
| 2,760,008 | 8/1956 | Schade | 178/DIG. 16 |
| 2,850,627 | 9/1958 | Moore | 178/DIG. 16 |
| 3,187,095 | 6/1965 | Rappold | 178/DIG. 16 |
| 3,436,474 | 4/1969 | Saeger | 178/DIG. 3 |
| 3,495,032 | 2/1970 | Smith | 178/6 |

OTHER REFERENCES

General Electric Transistor Manuel published Aug. 25, 1964 pp, 199–200 TK 7872 T 73 G 4 1964

*Primary Examiner*—Bernard Konick
*Assistant Examiner*—Howard W. Britton
*Attorney*—Richard T. Seeger

ABSTRACT: The quality of pictures and printed documents reproduced in a facsimile receiver is improved by the use of circuits in both the transmitter and receiver. These circuits provide a more linear overall response of the system when picutres are transmitted, a high contrast black on white response when printed matter is transmitted and in general provide for better quality reproductions of documents, while maintaining compatibility when operating between old and new machines. The approach is to provide a circuit at the transmitter which can be switched according to whether the documents scanned are primarily photo or printed in nature and to provide a circuit at the receiver to develop the desired copy qualities when operating under various circumstances.

INVENTORS
WILLIAM E. RICHESON
ROBERT H. DREISBACH

BY Jeffers and Young
ATTORNEYS

INVENTORS
WILLIAM E. RICHESON
ROBERT H. DREISBACH
BY Jeffers and Young
ATTORNEYS

INVENTORS
WILLIAM E. RICHESON
ROBERT H. DREISBACH

BY Jeffers and Young
ATTORNEYS

INVENTORS
WILLIAM E. RICHESON
ROBERT H. DREISBACH
BY Jeffers and Young
ATTORNEYS

TRANSMITTER

LINEAR/LINEAR

LOG./LINEAR

RECEIVER

LINEAR/LINEAR

LINEAR/LOG.

OVERALL SYSTEM RESPONSE

INVENTORS
WILLIAM E. RICHESON
ROBERT H. DREISBACH
BY Jeffers and Young
ATTORNEYS

LINEAR/LINEAR

LINEAR/LOG.

ORIGINAL TRANSMITTER

INVENTORS
WILLIAM E. RICHESON
ROBERT H. DREISBACH

BY Jeffers and Young
ATTORNEYS

OVERALL SYSTEM RESPONSE

OVERALL SYSTEM RESPONSE

INVENTORS
WILLIAM E. RICHESON
ROBERT H. DREISBACH

BY Jeffers and Young
ATTORNEYS

INVENTORS
WILLIAM E. RICHESON
ROBERT H. DREISBACH
BY Jeffers and Young
ATTORNEYS

INVENTORS
WILLIAM E. RICHESON
ROBERT H. DREISBACH

BY Jeffers and Young
ATTORNEYS

FACSIMILE SYSTEM WITH SELECTIVE CONTRAST CONTROL

BACKGROUND OF THE INVENTION

Our invention relates to an improved facsimile system and particularly to an improved facsimile transmitter and an improved facsimile receiver, each of which is compatible with transmitters or receivers of the same type but without our improved circuits.

Facsimile systems are used in various applications to scan a paper or document at one location and transmit document signals to a remote location where the scanned paper or document is reproduced. Such a facsimile system is disclosed in Ser. NO. 669,315, filed Sept. 20, 1967 in the names of Glenn A. Reese and Paul J. Crane. Such facsimile systems are used to reproduce all kinds of documents, including photographs, typed or printed material, or other information. While prior art facsimile systems have worked more or less satisfactorily, we have found that such systems do have some disadvantages. For example, we have found that in a given facsimile system which is scanning a photograph or document having all shades of gray between white and black, the overall system response, that is the "gray out"–"gray in" curve, should be as linear as possible. With such a linear response, the photograph reproduced at the facsimile receiver also includes all shades of gray between white and black, and can provide a very faithful and accurate reproduction. However when printed information or similar material is being scanned for reproduction at a remote location, we have found that a nonlinear system response is more desirable. This is because a nonlinear response produces a sharper contrast between white and dark in the document being reproduced, so that typed or written material appears very sharp with a white background and sharp dark or black letters. And associated with both of these problems is the characteristic or nature of the transmission medium between the facsimile transmitter and receiver.

Accordingly, an object of our invention is to provide a new and improved facsimile transmission system.

Another object of our invention is to provide a new and improved facsimile transmitter.

Another object of our invention is to provide a new and improved facsimile receiver.

Still another object of our invention is to provide an improved facsimile receiver that can be used with facsimile transmitters not having our invention and still provide an improved document.

A further object of our invention is to provide an improved facsimile transmitter which can be used with facsimile receivers not having our improved invention so as to provide an improved operation.

SUMMARY THE INVENTION

Briefly, these and other objects are achieved in accordance with our invention in a facsimile transmitter having a highly modified Schmitt trigger circuit coupled in the circuit between the point at which electrical signals are provided from a scanning device and the point in the electrical circuit where the signals are converted to frequency modulated signals. The Schmitt trigger circuit is provided with a feedback circuit in the form of a rectifier that provides a more linear system operation for picture scanning. The input of the Schmitt trigger is provided with a rectifier for improving the response for use with documents reproduced by carbon paper. The circuit is provided with controls which set the threshold and the saturation level of he transmitted signal. A switch is provided that can cause the circuit response to be appropriate to either photo or print copy. And the output of the Schmitt trigger is provided with upper and lower fixed clamping circuits to limit the frequency swing to a selected range. In a facsimile receiver in accordance with our invention, we provide an improved circuit between the point at which the frequency modulated signals are detected and the output to the transducers. This improved circuit utilizes a diode rectifier in shunt between the detected signals and the transducer, so as to develop the required gray scale transfer function in the receiving unit. We also provide a threshold control circuit so that the operator at the facsimile receiver can, when printed or written documents are being reproduced, set the threshold of response so that a sharp and clear transition is provided between white and black, negating low level signals which may be very noisy. We have also provided a background control so as to reduce the spacing between the styli and the copy set to minimize transit time effects of the styli so as to minimize horizontal displacements in the printing process and a saturation control so as to be able to adjust the gray level beyond which the copy will be black. Adjustment of these controls independently compensates for tolerance problems in production of such machines, with a resulting reduction of their cost.

BRIEF DESCRIPTION OF THE DRAWING

The subject matter which we regard as our invention is particularly pointed out and distinctly claimed in the claims. The structure and operation of our invention, together with further objects and advantages, may be better understood from the following description given in connection with the accompanying drawing, in which:

DESCRIPTION OF THE PREFERRED EMBODIMENTS

Figure 1:
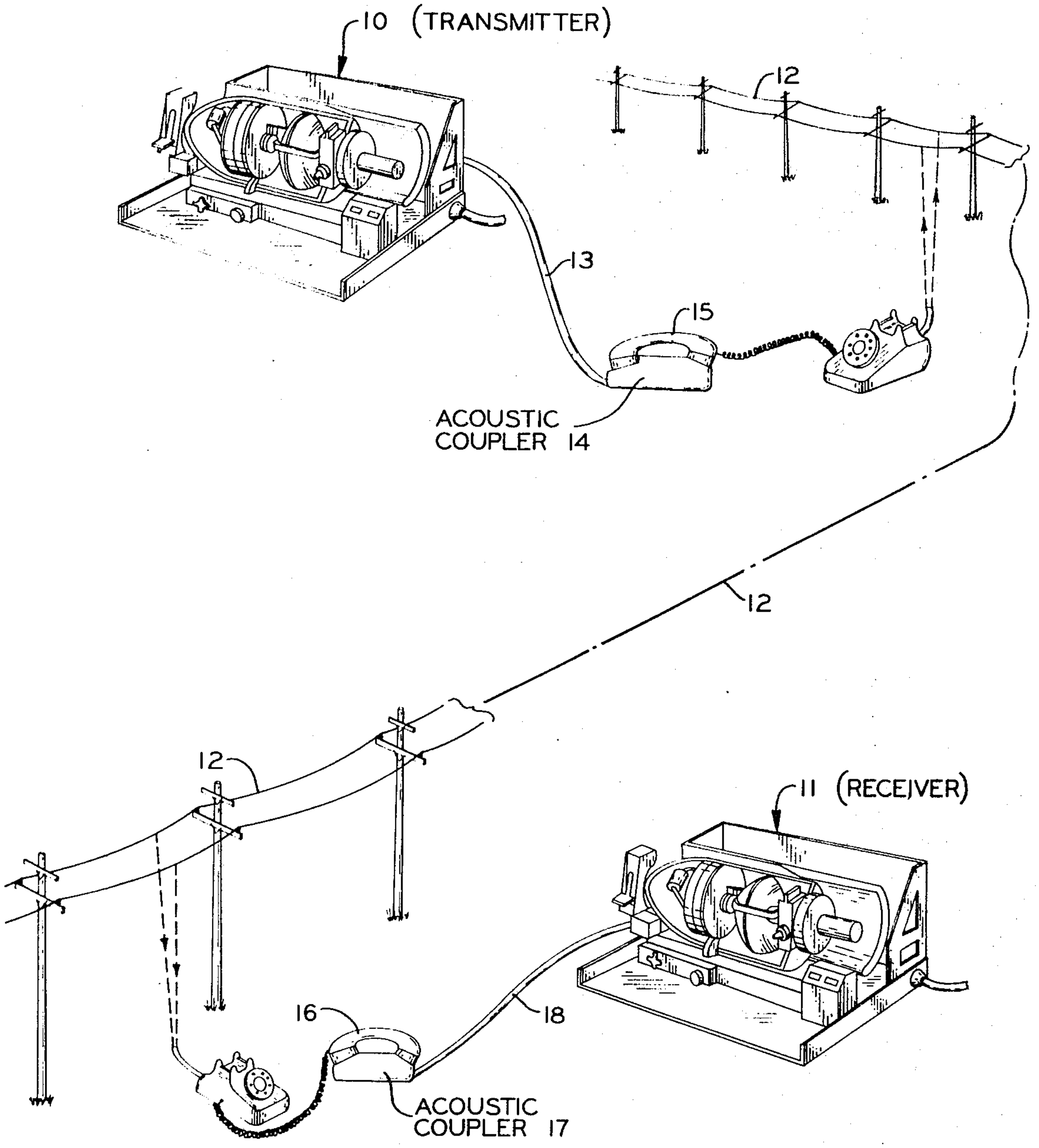
FIG. 1 is a diagrammatic perspective view of a facsimile system which can utilize our improved circuits in a facsimile transmitter and in a facsimile receiver.

In FIG. 1 we have shown a facsimile system having two facsimile machines 10, 11 connected over a telephone system 12. FIG. 1 shows an acoustic coupling to the phone line, inductive coupling or direct coupling can also be used. Usually, both facsimile machines 10, 11 are arranged so that either machine can be used to transmit or to receive. In FIG. 1 We have assumed that the facsimile machine 10 is used as a transmitter for scanning a document which is to be reproduced by the facsimile machine 11, so that the facsimile machine 11 is used as a receiver. The facsimile machines 10, 11 are known in the art and may be of the type shown in the aforementioned application, so they will only be briefly described. When used as a transmitter, the facsimile machine 10 scans a document, such as with a moving spot of light, and uses a light sensitive device for producing electrical signals indicative of the specific area on the document being scanned. These electrical signals may take various forms, although our invention contemplates videolike signals, that is, signals derived from an image. The transmitter 10 converts the electrical signals to frequency modulated signals having an audio frequency indicating the relative lightness or darkness of the document area being scanned. These frequency modulated signals are connected by a cable 13 to an acoustic coupler 14 having a loudspeaker or similar acoustic transducer which converts the electric signals into audible signals. The audible signals are directed toward the mouthpiece of an ordinary telephone handset 15. The telephone handset 15 is connected through the remainder of the telephone to the telephone system 12. By previous local or long distance connections, a person at the transmitter 10 can have established a connection with a telephone handset 16 at the location of the receiver 11. While we have shown the telephone system 12 as comprising simple open wire, it is to be understood that the system 12 may utilize any conventional communication facilities, such as cable, cable carrier, or radio carrier. The telephone at the receiver 11 has its handset 16 connected by an acoustic coupler 17 and a cable 18 to the receiver 11. When the acoustic coupler 17 is used in the receiving mode, the audible signals produced by the earpiece of the telephone handset 16 are directed toward a microphone in the acoustic coupler 17. The microphone in the acoustic coupler 17 converts these audible signals into electrical signals which are carried by a cable 18 to the receiver 11. The receiver 11 has appropriate electrical circuits for converting the electrical signals into mechanical functions which mark or produce marks on a document. If the receiver 11 is properly synchronized with the transmitter 10, the document produced by the receiver 11 is a fairly faithful and complete reproduction of the document scanned in the transmitter 10. However, as mentioned above, we have found that present facsimile transmitters and receivers do not produce as faithful a reproduction of photographs or documents having shades of gray as is desirable. Further, we have found that present facsimile transmitters and receivers do not provide a good, clean and sharp printed document. Thus, improved operation of existing facsimile systems is desirable, particularly from a customer or quality standpoint.

Figure 2:
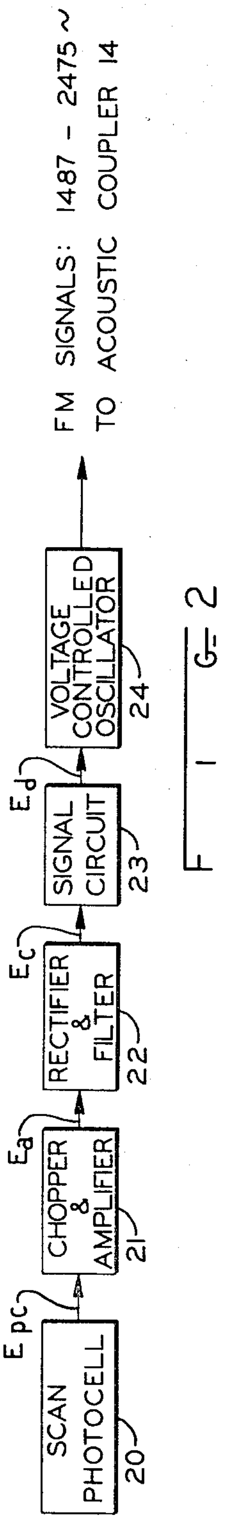
FIG. 2 shows a block diagram illustrating the electrical circuit of a facsimile transmitter in accordance with our invention.

FIG. 2 shows an overall block diagram of the electrical circuit incorporating our invention to scan a document and produce frequency modulated signals indicative of the document scanned. This circuit includes a scanning light sensitive transducer or photocell 20 whose signals are typically direct current. These signals are chopped or broken up for simplified amplification and amplified in the chopper and amplifier 21. The amplified video signals are then rectified and filtered to produce direct current signals which may vary between selected levels, for example, from 0 to 7 volts. In this selected range,0 volts represents white, voltages above 0 represent darker shades, and 7 volts represents black. This rectification and filtering takes place in a rectifier and filter 22, whose output circuit is then coupled to a signal circuit 23 in accordance with our invention. This signal circuit 23 is shown in detail in FIG. 4, and will be further described. Briefly, this circuit modifies the direct-current signals to make them have a different response for shades from white to black, and has a switch for altering the circuit 23 to transmit printed material using a more desirable transformation for these types of signals. Signals from our signal circuit 23 still fall within the direct current range between 0 and 7 volts, and are applied to a voltage controlled oscillator 24. The oscillator 24 utilizes the direct-current signals to produce frequency modulated signals which vary, for example, between 1,500 and2,450 cycles, depending upon the direct-current control voltage applied. These frequency modulated signals are applied to the acoustic coupler 14 in FIG. 1 which transforms them into a audible signals for application to the telephone handset 15 and transmission to the receiver 11.

Figure 3:
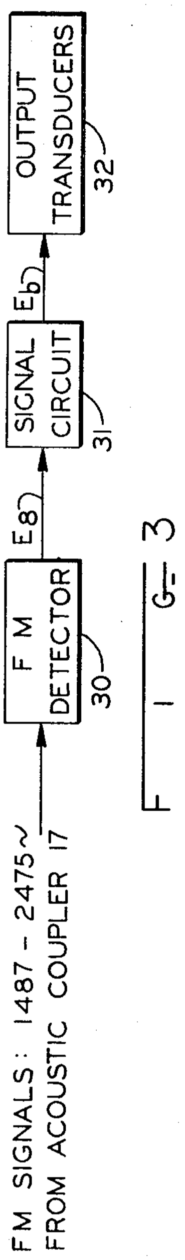
FIG. 3 shows a block diagram of an electrical circuit of a facsimile receiver utilizing our invention.

FIG. 3 shows a block diagram representing the electrical circuit used in the receiver 11 for receiving the frequency modulated signals. These signals are produced as audible signals by the telephone handset 16 and applied to the acoustic coupler 17 which transforms the audible signals into electrical signals representative of the frequency modulated signals between 1,500 and 2,450 cycles. These signals are applied through a frequency modulation detector 30 which transforms the signals into direct current signals having a range between 0 and plus 7 volts, but which can vary in this range at rates for example representative between direct current and 1,260 cycles. These direct-current signals are applied to a signal circuit 31 which, in accordance with our invention, further modifies the signals to make the response for the overall system more linear when signals representative of a picture are being transmitted. The same circuit when fed from the transmitter that is in the print mode creates an overall system response which gives a high contrast for"print" type of copy, and which may also be modified to set the white level at any desired threshold or background and to set the level of gray that will be printed black, that is, the saturation level. This circuit 31 is shown in detail in FIG. 5, and will be more fully explained. The direct current signals from the circuit 31 have sufficient power to drive the output transducers 32 which transform the electrical signals into appropriate mechanical or physical motion that marks or causes a mark to be produced on a document. This mark may be made by a pen and ink, or as we prefer, by pressing against a piece of carbon paper held against a paper that becomes the copied document. The pressure of this pressing causes the carbon paper to leave a mark which represents part of the picture being scanned at the transmitter 10.

Figure 4:
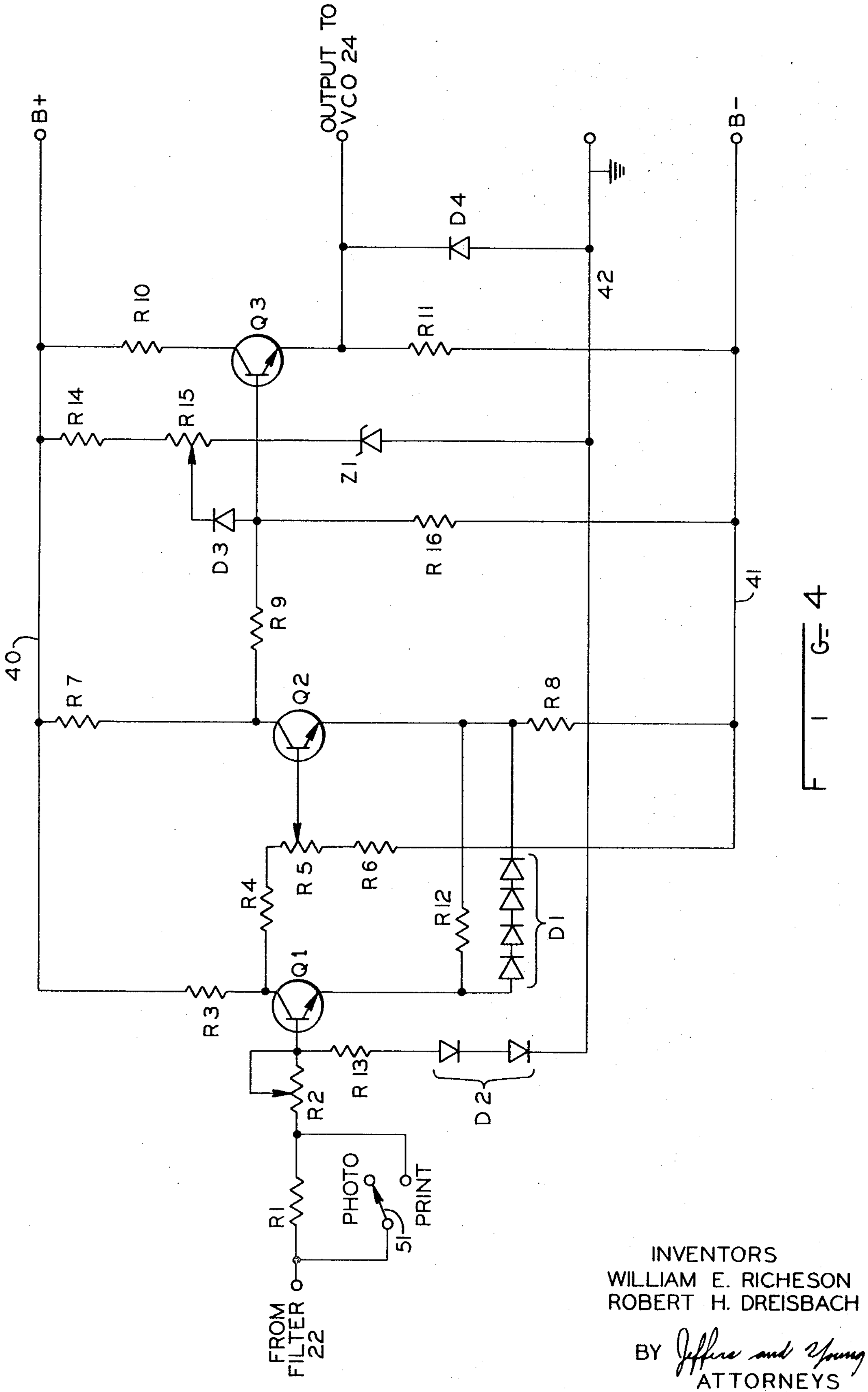
FIG. 4 shows a complete electrical schematic diagram of our improved circuit in the facsimile transmitter of FIG. 2.

In FIG. 4, we have shown a schematic diagram of our signal circuit 23. Basically, this circuit 23 comprises a modified Schmitt trigger circuit having two NPN-type transistors Q1 and Q2 coupled together partially in known fashion. Signals from the rectifier and filter 22 are applied through a resistor R1 and a potentiometer R2 to the base of the transistor Q1. A source of direct current having a positive voltage B+ and a negative voltage B− is provided at buses 40, 41 respectively. And, a reference bus 42, which may be connected to a ground or reference potential, is also provided. The collector of the transistor Q1 is coupled through a resistor R3 to the positive bus 40. The output from the transistor Q1 is coupled through a resistor R4 to a potentiometer R5 whose movable tap is connected to the base of the transistor Q2. The potentiometer R5 is coupled through an additional resistor R6 to the negative bus 41. The collector of the transistor Q2 is coupled through a resistor R7 to the positive bus 40, and the emitter of the transistor Q2 is coupled through a resistor R8 to the negative bus. The output of the transistor Q2 is derived at its collector and coupled through a resistor R9 to an amplifier transistor Q3 which is of the NPN-type. The collector of the transistor Q3 is coupled through a resistor R10 to the positive bus 40, and the emitter of the transistor Q3 is coupled through a resistor R11 to the negative bus 41. Output signals are derived at the emitter of the transistor Q3 with respect to the reference bus 42 for application to the voltage controlled oscillator 24.

The circuit as thus far described is more or less conventional. In accordance with our invention, we provide several additional circuits and feedback arrangements which improve the processing of picture and print derived signals, which alter the gray scales and which provide clamping of the output voltage. These circuits when used in conjunction with the improvements in application, Ser. No. 803,609 filed Mar. 3, 1969 by W. E. Richeson and entitled Background Sensing and Black Level Setting Circuit result in a vastly improved overall facsimile system. The first of these circuits comprises a resistor R12 and a diode rectifier D1 connected in the feedback circuit of the Schmitt trigger between the emitter of the transistor Q2 and the emitter of the transistor Q1. We have found that this feedback circuit of the resistor R12 in parallel with the diode rectifier D1 provides one method of creating the desired transformation of the signal from filter 22, and hence results in a signal that provides a more faithful system reproduction of the copy being scanned. We have shown the diode D1 as actually being four diode rectifiers connected in series, although it is to be understood that a single diode rectifier or other varistor (that is a two terminal semiconductor device having nonlinear voltage current characteristics) having the necessary voltage current characteristic may be used in place of the four individual diode rectifiers shown as well as the other diodes shown in the circuits. We have also found that where carbon paper is used to mark a document in the receiver 11, there is a certain carbon transfer characteristic between the energizing signal and the transfer of the carbon in the desired controlled way to impress the mark. To compensate for this characteristic, we provide at the transmitter a circuit comprising a resistor R13 and a diode rectifier D2 cou- 10104042 0038 pled between the base of the transistor Q1 and the reference bus 42. The reason for including this compensating circuit in the transmitter rather than in the receiver is to create a better signal to noise ratio as will appear more apparent later in the discussion. Persons skilled in the art will appreciate that the diode rectifier D2 may comprise only a single element rather than the two elements shown, if such a single element has the necessary characteristics. This circuit in association with R1, R2 and switch S1 provides one method for the required alteration in the response of the circuit from filter 22 to the VCO 24.

As mentioned earlier, it is desirable that documents with print or similar information have a fairly white background with a sharp, dark letter or lines. Where it is known that printed information is being transmitted, a switch S1 may be operated from its photo position to its print position to short circuit or bypass the resistor R1. When the resistor R1 is short-circuited, the input signals from the filter 22 are attenuated less and hence cause the overall transfer function to be greatly altered with a resultant change in the gray scale so as to produce a more desirable print copy at the receiver 11. It is also highly desirable to concurrently maintain a high signal to noise and/or high signal to interference ratio, either or both of which will be hence forth referred to as S/N ratio, in the transmission of the copy whether the machine is in the print or photo mode. This is accomplished by a trade off in the modulation index M and the differentials $\dot{M}$ of the modulation index (with the accompanying spectral changes) which develops the desired gray scale of the copy along with maintaining compatibility between old and new machines.

Higher values of the modulation index $M=\Delta f/f$ mean [where $\Delta f$ = the deviation due to a swing from two different gray levels and $f$ mean = the mean frequency being transmitted] of an FM system enhance the system S/N ratio. When the S/N ratio is poor the individual spots that are required in the received copy to make up a given reproduction are staggered back and forth. The spots making up a printed letter would be displaced in such a way (at or near random) so as to break up the print and make it unpleasant to look at or wholly useless. These effects are generally obvious on border lines or fine detail; the darker or more sudden the transition of the gray of the border in question the more obvious the effect due to contrast ratio.

The $\Delta f$ out of the voltage controlled oscillator 24 is a direct function of the $\Delta E$ from block 23 which is in turn a function of $\Delta g=g-g_2$ levels applied to the photo cell (gray level one, to gray level two differential). At the receiver the inverse is true: where a large M yields a high $\Delta E$ per $\Delta g$ in which causes the signal to generally be large as compared to the noise and hence the $\Delta g$ printed has a lesser equivocation.

It is therefore apparent that the nature of the $\Delta E$ vs $\Delta g$ curve affects not only the "gray out" vs. "gray in" of the copy but also affects the signal spectrum and the resultant S/N of the system.

In what follows it will be noted that the M and $\dot{M}$ will change as a function of what region of the gray scale is being transmitted at any one time. It is also noted that $f_{mean}$ as well as $\Delta f$ changes.

Figure 6:
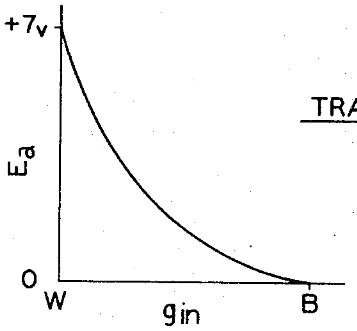
FIGS. 6 through 12 show graphs of various transfer functions within the prior art system.
Figure 7:
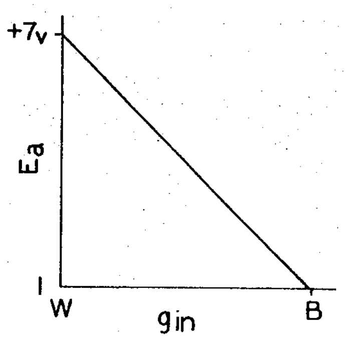
Figure 8:
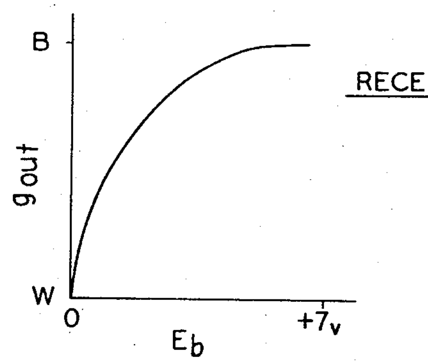
Figure 9:
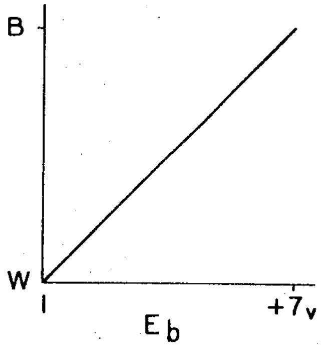
Figure 10:
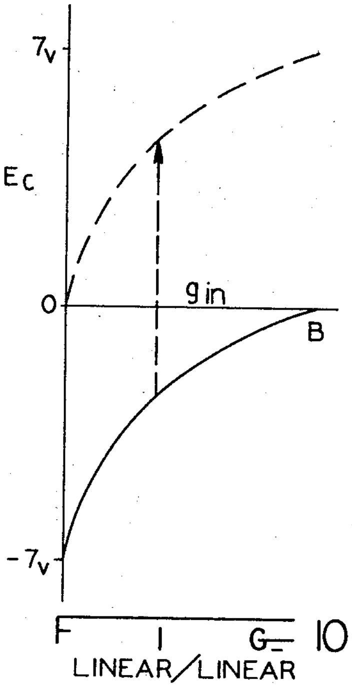
Figure 11:
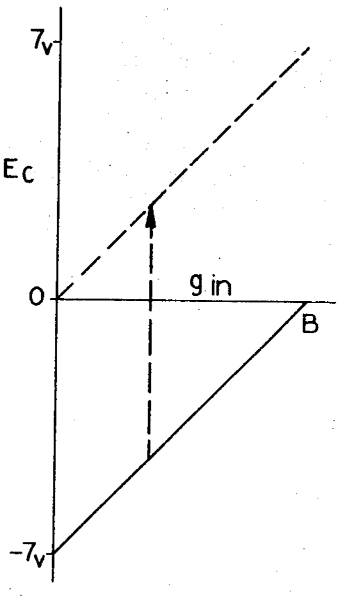

The original machine had the following characteristics prior to altering the transfer functions which controls the gray scale of the system: FIGS. 6 and 7 show linear and logarithmic representations of the voltage input to our improved transmitter circuit as a function of the gray, that is the gradations from white to black of the copy which the photo cell is scanning. Similarly, FIGS. 8 and 9 show the gray output, that is the gradations from white to black on the copy paper at the receiver as a function of the voltage input to the output transducers. Again both linear and logarithmic representations are shown. As can be seen in FIG. 7, the photo cell has zero output when being presented black and the heads have a requirement for a maximum energization when black printing is required. The drive to the heads could be such that black would be printed when the input to the write amplifier was zero. When the input to the write amplifier was maximum the drive in the heads could be zero. An alternate would be to have heads that would need to be retracted from the carbon in order to write in the white condition. In place of the above solutions, the voltage output from the photo cell, Epc, was inverted and a 7v level was added. The output of the base band board became as shown in FIGS. 10 and 11 yielding the overall system response shown in FIG. 12.

Figure 12:
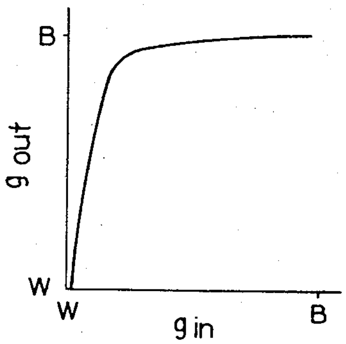

The effect of this prior art system as illustrated in FIGS. 6 through 12 and summarized in FIG. 12 was to greatly degrade photographs by distorting the gray scale. For photographs, the gray scale of the overall marking should be linear. There were other attendant difficulties in the tolerance of the system to small differences in its individual circuit responses caused by the circuit designs and the steepness of the "gray out-gray in" system response. The system adjustments could overcome the variance that was present during the production of the machine only after an expenditure of a great effort.

Figure 21:
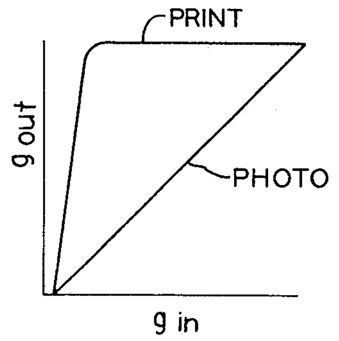
Figure 32:
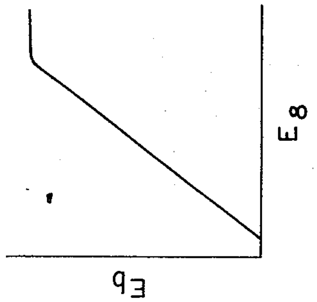
Figure 33:
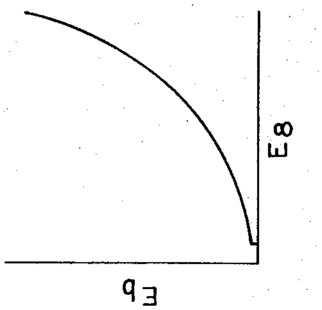
Figure 22:
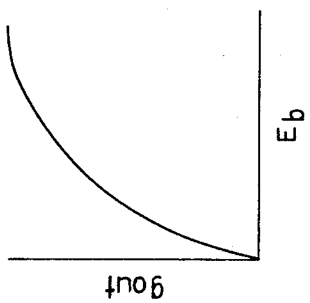
Figure 20:
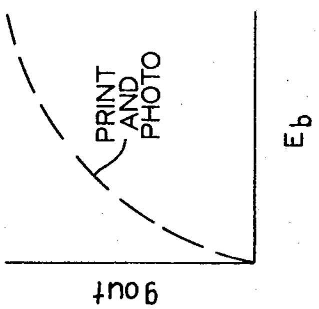
Figure 16:
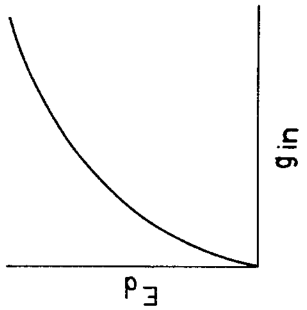
Figure 19:
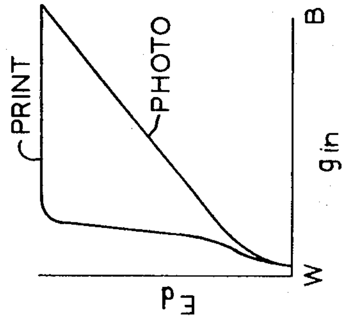
Figure 17:
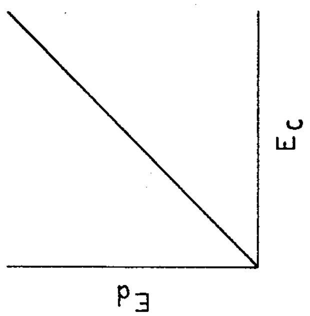
Figure 18:
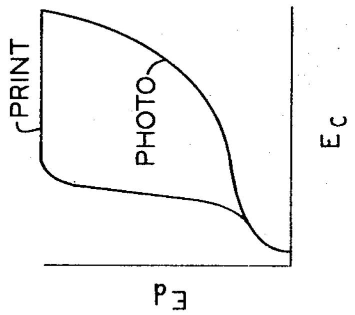

Even if there were no mechanization problems, note that in the near white region of FIG. 6 the slope of the curve is greatest. Similarly, for the receiver as illustrated in FIG. 8 the curve has its greatest slope in the near white region. At the transmitter a small $\Delta g$ gives rise to a large $\Delta E$ and when fed to the voltage controlled oscillator 24 this gives a large $\Delta f$. Since the modulation index is directly proportional to $\Delta f$, in these regions where noise on the copy can be easily seen there is a high modulation index (and a high $\dot{M}$) which causes a good S/N ratio to exist. There is a spin off benefit from the $gray_{out}$ vs $gray_{in}$ curve. Pictures are treated rather poorly and print is treated very well. It is worth noting that although the S/N ratio is improved and that the overall system response curve is reasonably satisfactory for the printed copy, a good portion of the high slope of the gray curve of FIG. 12 is due to the receiver transfer function. The S/N would be even better if all of this high slope were to take place at the transmitter and the receiver transfer function changed from the linear case as illustrated by the solid lines of FIGS. 13 and 14 to the dotted curves. The original system had the sequential transfer characteristics illustrated in FIGS. 15, 17, 16, 22, 32 and 31. In an attempt to get a high S/N ratio and the development of high contrast reproductions for a print mode as well as linear response for a photomode the system was further altered to have the sequence of responses shown in FIGS. 15, 18, 19, 20, 33, and 21. In this second sequence of graphs FIGS. 18, 19 and 21 show two curves, one illustrating the print mode and the other illustrating the photomode. In the remaining curves these two modes coincide. For the print mode, note that a high M and $\dot{M}$ result so as to give essentially the same overall system response curve on the gray scale, but due to the fact that all of the high slope and saturation occur at the transmitting end, the overall system has a higher S/N ratio. When sending photo information a linear $gray_{out}$ vs. $gray_{in}$ curve as desired is achieved.

Figures 23, 24, 25, 26, 27, 28, 29, 34:
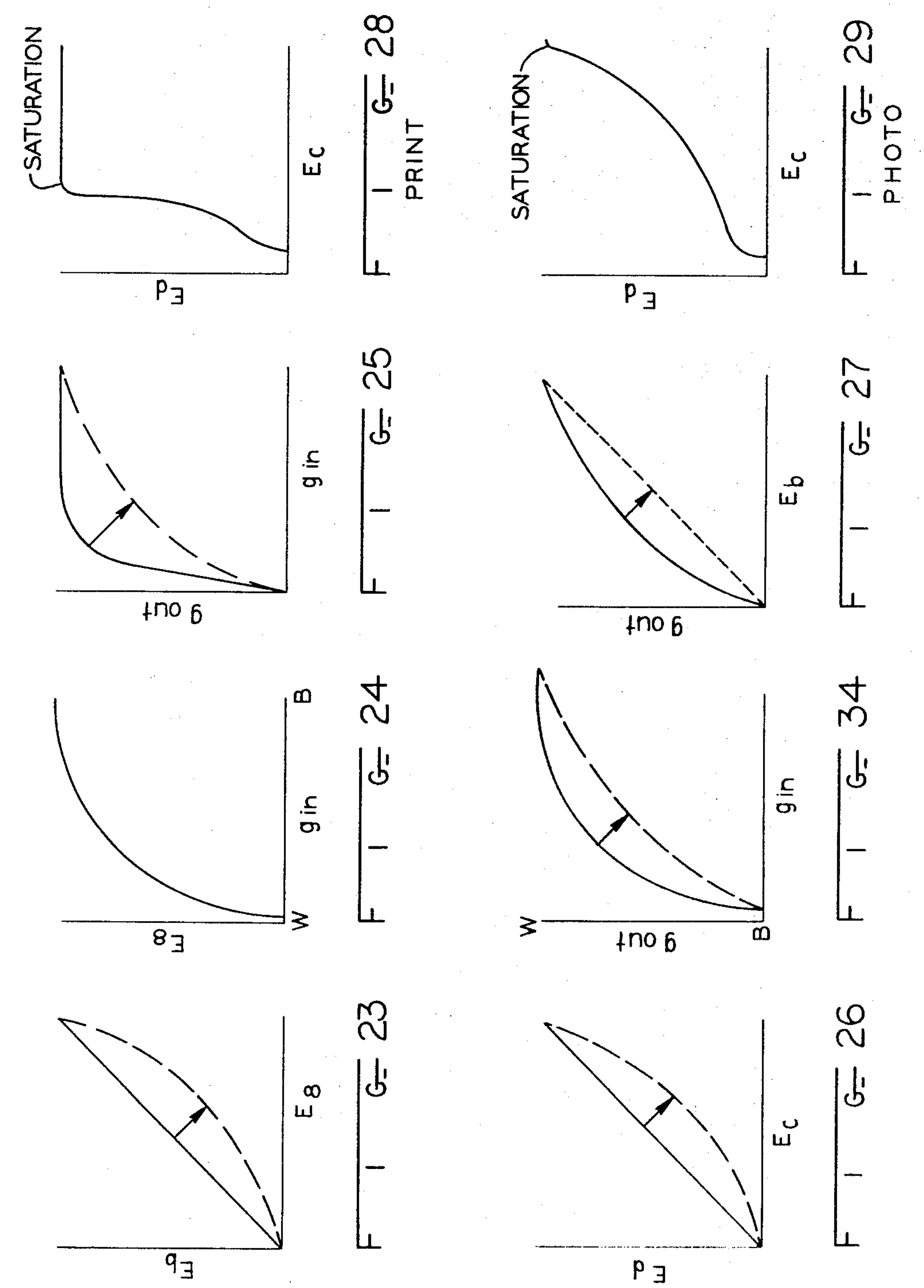

FIGS. 23, 24 and 25 illustrate the system response when an unmodified transmitter is feeding information to a receiver which has been modified according to the teachings of the present invention. In this sequence of three curves, the solid line represents a system operating without the improvements of the present invention and the dotted lines illustrate the response of the system using an improved receiver circuit, thus, for example the linear solid line of FIG. 23 merely means that the signal circuit 31 of FIG. 3 has a linear response and the dotted line of FIG. 23 shows that the improved receiver signal circuit has a nonlinear response as discussed in reference to FIG. 5, this nonlinearity is imparted to the receiver signal circuit 31 by providing the amplifier therein with a nonlinear feedback circuit. The case of transmitting from a new machine to an old machine is shown in FIGS. 26, 27 and 25. These changes are due to changes in signal block 31.

FIGS. 26, 27 and 34 illustrate sequentially what happens to the transfer functions when the old transmitter new receiver combination of FIGS. 23, 24 and 25 or 26, 27 and 25 is replaced by a new transmitter new receiver system, thus, the straight solid in FIG. 26 merely states graphically that the signal circuit 23 of FIG. 2 was formerly a linear amplifier and in the improved system it is nonlinear as illustrated by the dotted line. Again, this nonlinearity is intentionally introduced into the system by providing nonlinear feedback in the circuit of FIG. 4. Of course, the transmitter response of FIGS. 26, 27 and 34 is indicative of its operation during the photomode only.

In making these changes in the transmitter and the receiver characteristics the machine is compatible with the old machines.

When transmitting from a new machine to an old machine there are two modes, print and photo yielding high contrast copy and a linear reproduction respectively.

When a new machine is receiving from an old machine the copy essentially midway between a high contrast and a linear rendition.

When transmitting from a new machine to an old machine the copy is of a high contrast on the print mode and is not as linear a rendition as when received by a new machine.

Some carbon paper transfer characteristics are such that more force/unit gray scale change is required in the white part of the transfer characteristic in order to get a linear overall system $g_{out}$ vs $g_{in}$ curve. This change could take place at either the transmitter or receiver however, if it takes place at the transmitter then the system will have a high M and hence a high S/N ratio. Further, in order to eliminate background fluxuation due to smudging, dirt and other unwanted low level marks, two moves are taken.

1. Threshold the transmitter a $\Delta g$ above the established automatic background.

2. Threshold the receiver a $\Delta g$ above the transmitted background in the transmitted white level.

The threshold at the transmitter can be accurately held above the background and when the threshold is reached, there is a high M and $\vec{M}$ which is good. Small unwanted perturbations in the background gray level are prevented from being transmitted.

The threshold at the receiver can make up for small errors in the white level frequency (1500), errors in adjustment of the receiver ($E_{out}$ at 1500) and it also reduces the effect of phone line noise and interference.

The initial threshold found in the transfer functions of circuit of FIG. 4 shown in FIG. 28 and FIG. 29 is controlled by the setting of R5 operating in a manner similar to other Schmitt circuits. The initial rapid rise of the convex up portion of the two curves is mainly controlled by R13 working in conjunction with D2. When the voltage $E_c$ is small the shunting effect of R3 and D2 on R2, R1 and R2 is negligible. Above a certain input voltage, $E_c$ will be attenuated increasingly as the current builds up in D2 to a final value determined R13, R1 and R2, or R13 and R1 as determined by the position of switch S1. The concave up portion of the curves is caused by R12 and D1. This circuit represents a nonlinear positive feedback that increases the gain of the overall circuit with $E_c$. The rate of rise to a saturated level is controlled by R2 in case of the print mode and in case of the photomode by R1 in conjunction with R2. The function here is one mainly of gain.

The controlled threshold is for the purpose of negating all markings such as smudges below a certain gray level, and operating only on gray levels above a chosen background level.

The initial convexity of the curve is for the purpose of rapidly giving precedence to levels above the chosen threshold. This is required to overcome certain threshold effects in the carbon transfer characteristics of various types of carbon set.

The saturation level is set by R2 for the purpose of adjusting the gray level at which the resultant copy will be fully black.

As known to persons familiar with the telephone art, the typical telephone transmission line or circuit has definite transmitter spectral energy limitations due to system signaling schemes. In order that these limitations not be exceeded by the transmitter, and in order that the full range between white and dark can be reproduced, we provide a clamping circuit in the transmitter of FIG. 4 which limits or clamps the output voltage to a desired selected level, in this case between −0.25 and plus 7 volts which causes the maximum transmitted frequency to be 2,450 Hz. This clamping circuit comprises a series circuit having a resistor R14 connected to the positive bus 40, a potentiometer R15 connected to the resistor R14, and a Zener diode or rectifier Z1 connected between the potentiometer R15 and the bus 42. A diode rectifier D3 is connected to the base of the transistor Q3 and to the potentiometer R15, and a resistor R16 is coupled between the base of the transistor Q3 and the negative bus 41. The setting of the movable tap on the potentiometer R15 sets the upper limit for the direct-current voltage which can be produced by the transistor Q3. A diode rectifier D4 is coupled between the emitter of the transistor Q3 and the reference bus 42 to set the lower limit of the direct current output voltage produced by the transistor Q3. This clamping circuit limits the range of direct-current voltage which can be produced, and insures that the direct-current voltage is held to the frequency limits of the telephone line and represents the full range between white (0 volts) and black (plus 7 volts.

Figure 5:
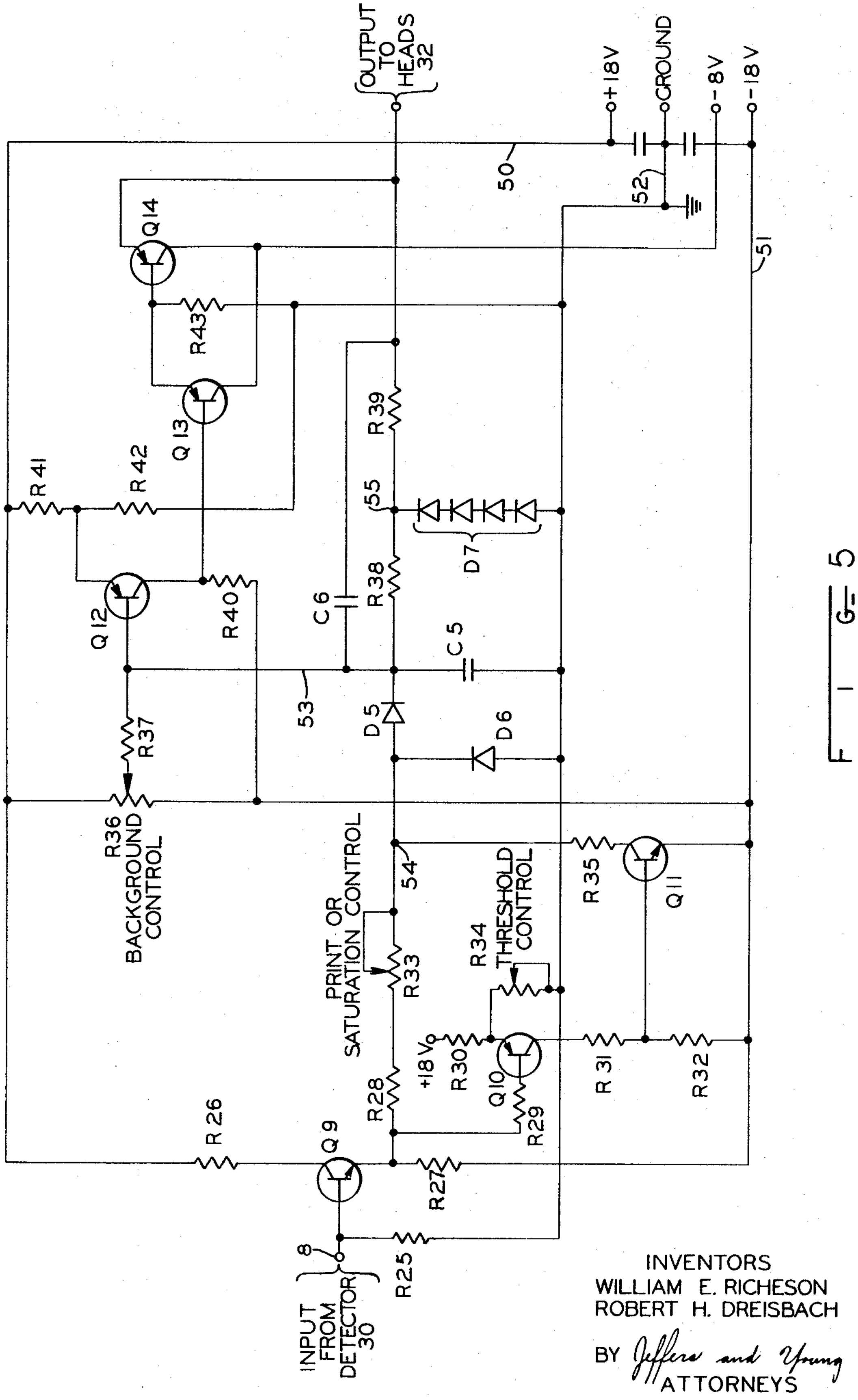
FIG. 5 shows a complete electrical circuit diagram of our improved electrical circuit utilized in the facsimile receiver of FIG. 3.

FIG. 5 shows an electrical circuit diagram of our signal circuit 31 used in the block diagram shown in FIG. 3 and representative of the circuit in the receiver 11 of FIG. 1. In FIG. 5, we again provide a positive source of direct current, a negative source of direct current, and a reference. The positive source is supplied as a voltage B+ on the positive bus 50, and the negative voltage is supplied as a negative voltage B− on the negative bus 51. The point of reference potential or ground is connected to a reference bus 52. In FIG. 5, signals from the detector 30 are applied to the base electrode of an NPN-type amplifying transistor Q9. The base may be connected to the reference bus 52 by a resistor R25, and the emitter and collector electrodes are connected to the positive bus 50 and the negative bus 51 by the resistors R26 and R27. Output voltage from the transistor Q9 is supplied through a resistor R28 and a potentiometer R33 and a diode rectifier D5 to a current or summing bus 53. This bus 53 is connected to an amplifier comprising three transistors Q12, Q13, Q14 which are of the PNP-type and which are connected by appropriate resistors between the positive bus 50 and the negative bus 51. The output from the last transistor Q14 is derived at its emitter and is supplied to the output transducers or heads 32. The circuit as thus far described is more or less conventional, and amplifies the direct current voltage supplied from the detector 30 for use by the transducers or heads 32. In accordance with our invention, we provide a threshold control circuit comprising a PNP-type transistor Q10 and an NPN-type transistor Q11. This threshold control circuit provides a current to the summing bus 53 in operation with a diode rectifier D6 connected between the potentiometer R33 and the diode D5 and the reference bus 52. Signals from the emitter of the transistor Q9 are applied through a resistor R29 to the transistor Q10. The collector of the transistor Q10 is coupled through a resistor R31 to the base of the transistor Q11. to the junction point 54 at the diode rectifiers D5, D6.

The signal from 30 on FIG. 3 fed to point 8 on FIG. 5 ranges from 0 to +7$v$. When the input is 0 or some value below a given value referred to as the threshold value Q10 is in a conducting state. The conducting state of Q10 is caused by the voltage on its base relative to the voltage on its emitter. The forward bias level is set by the voltage divider R34, R30. The conduction state of Q10 causes Q11 to be in conducting state via the voltage divider R31, R32. Current from the bus 31 is fed through Q11, R35 and D6 to bus 52, this causes the diode D6 to be in a low impedance condition. As long as the diode is in a conducting state bus 34 is prevented from going positive. When point 5, the base of Q9, and hence the emitter of Q9 goes positive a sufficient amount (the threshold level) transistor Q10 becomes nonconducting (this is made possible by the voltage drop across R28) causing its collector to go in a negative direction. A ratio of this change is fed to the base of Q11 via the resistor divider R31, R32. This negative going voltage turns Q11 off. The current that has been passing through the transmitter Q11 from bus 51 via resistor R35 to diode D6 ceases. Diode D6 no longer conducts and hence its clamping action on bus 54 is halted. Bus 54 can now rise according to the dictates of the emitter of Q9 and hence according to the input from detector 30.

As bus 54 rises then D5 causes bus 53 to rise. Bus 53 is an input node to an operational amplifier Q12, Q13, Q14 with feedback via R38, R39 and hence bus 53 rises very little. The input 8 converted into a current input via R28, R33. Its level is controlled by the saturation control R33.

Prior to the input reaching a threshold value node 53 is controlled only by the feedback via R38, R39 and the injection current level from R36, R37. This injected current level causes a background current to flow in line 32. Adjustment of the background level is independent of bus 54 because of the nonconducting state of D5 when the input 8 is below the threshold value. Likewise, in the adjustment of the threshold value, it can be adjusted without affecting line 32 when the input 8 is below the threshold value.

In addition to the improved threshold control circuit, we provide an improved feedback circuit from the output to the heads 32 and the current summing point 53. This feedback circuit comprises two resistors R38, R39 shunted by a capacitor C6. The junction point 55 of the resistors R38, R39 is connected through a diode rectifier D7 (actually represented by four diode elements) to ground. This feedback circuit provides a more linear system gray scale response so that when photographs are being reproduced, they are more faithful than could be obtained without this feedback circuit.

Figure 13:
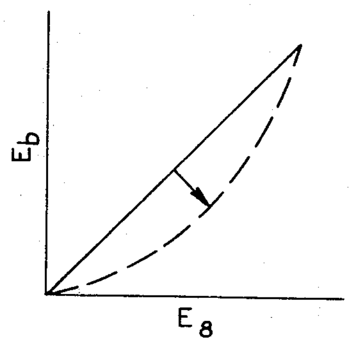
FIGS. 13 through 34 illustrate in a qualitative way the transfer functions in our improved system under various operating situations.
Figure 14:
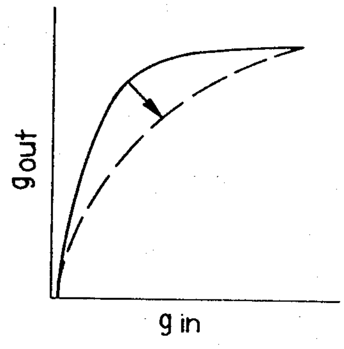
Figure 15:
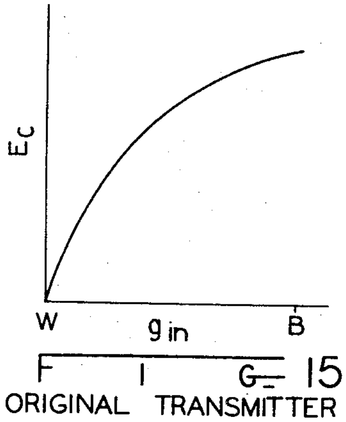
Figure 31:
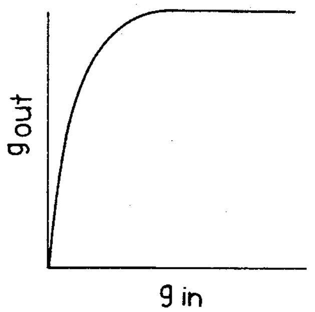
Figure 30:
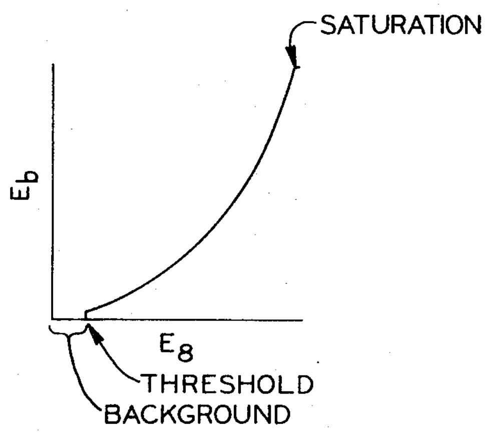

FIG. 13 illustrates the effect of the feedback circuit R38, R39, D7 (capacitor C6 is applied because of circuit stability considerations). The concave response is caused by the fact that when input current (to bus 53) levels rise in value the output of the circuit bus 32 goes negative, there is a resultant negative feedback current to node 53 caused by R38, R39. As this level of feedback rises then the voltage at node 55 goes negative, this event eventually causes diode D7 to conduct to a greater or lesser extent thereby modifying the degree of negative feedback and hence the gain of the circuit. When the input 8 is larger, the gain (the slope of the transfer function increases with the level of the input 8) of the overall circuit is greater. This effect causes the voltage transform of FIG. 30 $E_B$ vs $E_8$ to be created which in turn causes the overall system transform to be modified as is shown in FIG. 14.

When sending photo copy the transmitter transfer function is modified via the circuit of FIG. 4 as shown in FIG. 18. This effect plus that caused by the previous circuit of FIG. 5 as shown in FIG. 23 causes the system "gray out" vs. "gray in" curve to become linear as shown in FIG. 21. The offset found in FIG. 27 is variable and is caused by the threshold value selected by the control R34.

When sending print copy, the transmitter transfer function is modified via the circuit of FIG. 4 as shown in FIG. 18. This effect plus that caused by the previous circuit of FIG. 5 as shown in FIG. 25 cause the system "gray out" vs. "gray in" curve to be that in FIG. 21. The offset effect is caused by the threshold level that is selected via control R34.

In either of the above cases the level at which saturation is reached (beyond which the output is fully black) can be adjusted via R33 (R28 and R33 are responsible for conversion of input 8, as found on emitter Q9, to an input current level to bus 54) and via R2 if both the new receiver and transmitter are in use where as either R33 or R2 when one machine in an operating pair is of the new type of machine.

It will thus be seen that our invention provides improved circuits for a facsimile system, and particularly improved circuits for a facsimile transmitter and for a facsimile receiver. Ideally, both the transmitter and receiver should include our improved circuits so that the best possible operation for all types of documents can be obtained. However, a customer having our improved circuits in his equipment may transmit to or receive from a customer whose equipment does not have our improved circuits. However, the customer having our improved circuits can provide better operation or sending signals to the customer not having our circuits, or a customer having our improved circuits can reproduce better documents from a customer having a transmitter without our improved circuits. Therefore, our circuits provide improved facsimile operation for either a transmitter, or a receiver or for both a transmitter and receiver. While we prefer that the transmitter and receiver have all of our improved circuits, persons skilled in the art will appreciate that his is not absolutely essential. Only portions of our improved circuits may be incorporated to provide improved operation. Persons skilled in the art will further appreciate that the Schmitt trigger may be replaced by any of several nonlinear saturating amplifier circuits and the phrase "A Schmitt triggerlike circuit is intended in encompass these." Therefore, while our invention has been described with reference to particular embodiments, it is to be understood that modifications may be made without departing from the spirit of the invention or from the scope of the claims.

What we claim as new and desire to secure by Letters Patent of the United States is:

1. In a facsimile transmitter having means for scanning a document to be transmitted and producing electrical signals indicative of the information scanned from said document, an improved transmitter comprising:

a. input terminals for receiving electrical signals indicative of the information scanned from a document;

b. a Schmitt triggerlike circuit having first and second electron current devices coupled together between an input circuit and an output circuit, said devices having a nonlinear feedback circuit coupled therebetween;

c. means coupling said input circuit of said Schmitt trigger to said input terminals;

d. at least one varistor coupled to said feedback circuit to improve the character of said electrical signals;

e. and means coupled to said output circuit and adapted to be coupled to a voltage controlled oscillator for applying said signals thereto for transmission.

2. The improved transmitter of claim 1, and further comprising a resistor coupled in series between said Schmitt trigger input circuit and said input terminals, and a selectively operable switch for short-circuiting said resistor.

3. The improved transmitter of claim 1, and further comprising clamping circuit means coupled to said output circuit of said Schmitt trigger circuit for limiting the direct-current voltage variation of said Schmitt trigger output.

4. The improved transmitter of claim 1, and further comprising a clamping circuit coupled to said output circuit of said Schmitt trigger for limiting the direct-current voltage variation thereof, and a serially connected resistor and diode rectifier coupled between said input circuit of said Schmitt trigger and a point of reference potential.

5. The transmitter of claim 1 further comprising means for selectively increasing the gain of said Schmitt trigger circuit as the input increases.

6. The transmitter of claim 5 wherein the means for increasing comprises a parallel resistor varistor combination connected between the emitters of said first and second electron current devices.

7. The transmitter of claim 1 further comprising means for selectively decreasing the gain of said Schmitt trigger circuit as the input level increases.

8. The transmitter of claim 7 wherein the means for decreasing comprises a resistor and series varistor coupled between the input of said first electron current device and a point of reference potential.

9. The improved transmitter of claim 8, and further comprising a resistor coupled between said input of said Schmitt trigger and said input terminals, and a selectively operable switch connected in parallel with said resistor for selectively short-circuiting said resistor.

10. In a facsimile transmitter having means for scanning a document to be transmitted and producing electrical signals indicative of the information scanned from said document, an improved transmitter comprising:

a. input terminals for receiving electrical signals indicative of the information scanned from a document;

b. a Schmitt triggerlike circuit having first and second electron current devices coupled together between an input circuit and an output circuit, said devices having a feedback circuit coupled therebetween;

c. means coupling said input circuit of said Schmitt trigger to said input terminals comprising a resistor and a selectively operable switch in parallel with said resistor for selectively short-circuiting said resistor;

d. and means coupled to said output circuit and adapted to be coupled to a voltage controlled oscillator for applying said signals thereto for transmission.

11. In a facsimile receiver having means for receiving electrical signals and producing an output on a document indicative of the information scanned from a document at a remote location, an improved receiver comprising:

a. input terminals for receiving electrical signals indicative of the information scanned from a document;

b. an amplifier circuit having an input coupled to said input terminals and having an output adapted to be coupled to a transducer that converts electrical signals into information on a document;

c. and a feedback circuit comprising a series resistor and varistor coupled to increase the gain of the amplifier as the input level increases.

12. The improved resistor of claim 11, and further comprising a threshold circuit having current limiting devices and a varistor coupled to said feedback circuit.

13. The improved receiver of claim 11, and further comprising a voltage divider potentiometer connected to one current control device of said amplifier.

14. The improved receiver of claim 11, and further comprising an adjustable resistor connected in series between the output and input of two adjacent current control devices of said amplifier.

15. The improved receiver of claim 11, and further comprising current limiting devices and a varistor coupled to said feedback circuit to provide threshold control, and a voltage divider potentiometer coupled to one electron current control device of said amplifier to provide background control.

16. The improved receiver of claim 11, and further comprising current limiting devices and a varistor coupled to said feedback circuit to provide threshold control, and an adjustable resistor coupled in series between the output and input of two adjacent current control devices of said amplifier to provide saturation control.

17. The improved receiver of claim 11, and further comprising a voltage divider potentiometer coupled to one electron current control device of said amplifier to provide background control, and an adjustable resistor coupled in series between the output and input of two adjacent current control devices of said amplifier to provide saturation control.

18. The improved receiver of claim 11, and further comprising current limiting devices and a varistor coupled to said feedback circuit to provide threshold control, a voltage divider potentiometer coupled to one electron current control device of said amplifier to provide background control, and an adjustable resistor coupled in series between the output and input of two adjacent electron current control devices of said amplifier to provide saturation control.

19. A facsimile transmission system comprising:

a transmitter having means for scanning a document to be transmitted and producing electrical signals indicative of the information scanned, said transmitter comprising:

a. input terminals for receiving electrical signals indicative of the information scanned from a document;

b. a Schmitt triggerlike circuit having first and second electron current devices coupled together between an input circuit and an output circuit, said devices having a nonlinear feedback circuit coupled therebetween;

c. means coupling said input circuit of said Schmitt trigger to said input terminals;

d. at least one rectifier device coupled to said feedback circuit to improve the character of said electrical signals;

e. and means coupled to said output circuit and adapted to be coupled to a voltage controlled oscillator for applying said signals thereto for transmission;

f. and a receiver having means for receiving electrical signals and producing an output on a document indicative of the information scanned by the transmitter, said receiver comprising;

g. input terminals for receiving electrical signals indicative of the information scanned from a document;

h. an amplifier circuit having an input coupled to said input terminals and having an output adapted to be coupled to a transducer that converts electrical signals into information on a document;

i. and a feedback circuit comprising a series resistor and rectifier device coupled to increase the gain of the amplifier as the input level increases.

20. The method of transmitting facsimile information comprising:

optically scanning an original document;

transforming the optical information thus scanned into electrical signals;

nonlinearly amplifying in one of a plurality of selectable modes the electrical signals, the gain effected by said amplification being higher for larger electrical signals;

transmitting the information represented by the thus amplified electrical signals to a remote location;

nonlinearly amplifying the thus received signals, the overall effect of both said nonlinearly amplifying steps being nonlinear; and reproducing from the amplified signals a facsimile of the original document.

21. A facsimile transmitter comprising:

a. scanning means for optically scanning an information bearing document;

b. first transducer means for converting light energy into electrical signals representative of said information;

c. analog signal processing means responsive to said electrical signals and operable in a first mode to nonlinearly amplify said electrical signals in a first manner and operable in a second mode to nonlinearly amplify said electrical signals in a second manner whereby said first and second manners yield output signals which are identical for both maximum and minimum values of said electrical signals and nonidentical output signals for all values intermediate said maximum and said minimum values; and d. second transducer means responsive to said amplified electrical signals to produce energy signals representative of said information.

22. The facsimile transmitter of claim 21 further comprising clamping means for limiting the magnitude of said amplified signals.

23. In a facsimile transmitter having means for scanning a document to be transmitted and producing electrical signals indicative of the information scanned from said document an improved transmitter comprising:

input terminals for receiving electrical signals indicative of the information scanned from a document;

a Schmitt triggerlike circuit having first and second electron current devices coupled together between an input circuit and an output circuit, said devices having a nonlinear feedback circuit coupled therebetween to provide analog output signals in response to analog input signals;

means coupling said input circuit of said Schmitt trigger circuit to said input terminals; and means coupled to said output circuit and adapted to be coupled to a voltage controlled oscillator for applying said signals thereto for transmission.

24. The transmitter of claim 23 further comprising means to alter the sensitivity of said Schmitt triggerlike circuit.

* * * * *